C. H. TALLMADGE.
ACCOUNTING SYSTEM.
APPLICATION FILED MAR. 1, 1909.

1,084,669.

Patented Jan. 20, 1914.

Witnesses
George C. Higham.
M. Shepley.

Inventor
Charles H. Tallmadge
By
Attorneys

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

ACCOUNTING SYSTEM.

1,084,669.

Specification of Letters Patent.   Patented Jan. 20, 1914.

Application filed March 1, 1909. Serial No. 480,685.

*To all whom it may concern:*

Be it known that I, CHARLES H. TALLMADGE, a citizen of the United States, residing at Chicago, in the county of Cook and State of Illinois, have invented certain new and useful Improvements in Accounting Systems, (Case 10), of which the following is a full, clear, concise, and exact description, reference being had to the accompanying drawing, forming a part of this specification.

My invention relates to accounting systems, with particular reference to the distribution of the general expense or burden between various jobs.

One of the methods in common use has been to apportion at the end of the month the total burden to the various jobs according to the number of hours spent on each job, no account being taken of the fact that one workman may be more valuable than another, or that he may occupy more room or be employed on a more expensive machine. By another method the labor-cost of the various jobs is made the basis for the burden distribution. This has obvious features of inaccuracy, analogous to those given above. By still a different method each of the various machines is given a certain fixed burden rate, determined by theory or by experience during previous months. The amount of burden to be borne by each machine is calculated by multiplying its rate by the number of hours during which it has been in operation. It is evident that at the end of the month, on ascertaining the total burden to be distributed, this total in all probability will not agree with the amount of the burden distributed to the several machines by the method above mentioned; and this discrepancy, which is assumed to be a shortage of distribution, is handled by a secondary apportionment, involving a so-called supplemental rate. Let us suppose for example that the normal or principal burden rate for machine M is $1.00 per hour, and for machine N, $2.00 per hour, and that M has been in operation for one hundred hours during the month and N for seventy-five hours. It is evident that the burden distributed to M, by reason of its principal rate, will be $100.00, and to N, $150.00, making a total of $250. Now let us suppose that the total burden charge at the end of the month is found to be $300.00. $50 still remains to be distributed and this amount is divided by the total number of hours worked, namely, one hundred seventy-five, giving a figure of approximately twenty-nine cents per hour, for the supplemental rate, which is then added to the original rate, making the total rate for M, $1.29 per hour, and for N, $2.29. The hourly rates for the two machines which have thus been obtained are then applied to the various jobs according to the number of hours the machines have been in operation. For example: if M has been employed fifty hours on job 1, and N has been employed twenty-five hours on the same job, the burden charge for job 1 would be fifty times $1.29, plus twenty-five times $2.29, which makes a total for job 1 of $121.75. And if the machines have been employed the balance of their time on job 2, the burden apportionment to that job at the same rates would be $179. Although this method is considered by many to be much superior to those previously mentioned, it is evident that it is still a very crude approximation, and seriously deficient in flexibility. Results can only be obtained periodically, as for example, once a month. In none of these methods of the prior art is there a current knowledge of results, nor any considerable approach to an automatic or mechanical handling of the data, which are among my principal objects.

In my system, each workman has assigned to him a wage register which, as he works, automatically indicates the amount of wages he has earned. Associated with this register is a so-called waste-wage register which is adapted to be automatically actuated simultaneously with the wage register. A multiplicity of labor job registers is also provided to indicate the direct labor or wage cost of the job, a suitable number being associated with each job, according to the number of workmen likely to be employed. When a workman is assigned to a job, he puts in operation one of the labor registers associated with this job, and by automatic means the operation of his waste-wage register stops simultaneously. I have mentioned a waste-wage register and a labor job register as being associated with each workman, but in order to simplify the system it will in most cases be sufficient to provide merely the actuating mechanisms for such registers.

When a plurality of workmen are employed, the actuations of all of the waste-wage mechanisms will by means of suitable differential gearing be totalized and a single register will be used to show the total amount of waste-wages. Similarly the actuations of the various mechanisms for labor cost will be totalized for each job, and these totalizations again totalized, to give the total labor cost distributed to the various jobs. The separate wages of the individual workmen mentioned in the first line of this paragraph, are also currently accumulated in a total wage register, whose reading equals the sum of the totalizations of the waste-wage register and the total labor job register. Each man has assigned to him, not only a certain wage rate, but also a certain normal burden rating, or weight, according to the importance of the work he does, the space he occupies, the kind of machine on which he works, the amount of supervision he requires, the number and rating of the other employees, and many other factors of varying importance. It is no part of my invention to specify how these burden rates shall be determined, but rather to provide method and means for equipping each workman with his own appropriate rate, however determined. This may or may not be identical with another man's rate; it may be readjusted as often as desired; and, finally, it is important to note that it is essentially a relative rate, or ratio, normally in coöperation with the rates of the other workmen to distribute a gross burden charge, which may itself vary from time to time. This being so, the actual effect of a given man's burden rate upon his job varies with every change in the number of the rating of his fellows at work, as well as with every variation of the burden to be apportioned. One man's burden rate may be greater than his wage rate, and another's may be less. For example: workman A may be paid twenty cents per hour, and may be given a normal burden rate of twenty five cents per hour, while B may be paid fifteen cents per hour and given a normal burden rate of ten cents per hour. In effect, any arbitrary burden rate may be assigned to a given job as for example by changing a workman's burden rate while he is on that job, by using a dummy plug or by some similar means on the principle of "charging what the traffic will bear," if that should be desired—one job double the normal rate, and another job one-half or one-quarter; and, while this would impair the scientific ascertainment of cost, certain novel and valuable features would still be secured, to wit: the automatic imposition of the burden as each job progresses; the automatic current summation of the burden actually imposed on all the jobs, and the automatic balancing of this total distribution against a current accumulation of the total burden which theoretically should be distributed. In connection with the facilities provided for currently observing the accumulation and for varying its rate, this mechanical method affords a close approximation to the squaring-in of the cost accounts with the fiscal accounts, which has been recognized by accountants as a desideratum of the first importance.

Returning to a general description of the mechanical features: associated with the actuating mechanisms for labor distribution to any particular job are the same number of actuating mechanisms for burden distribution. For example: when workman A is assigned to a job, at the same time that he puts in operation the actuating mechanism for the labor registration at the rate of twenty cents per hour, he starts a second actuating mechanism for burden distribution at the normal rate of twenty-five cents per hour. Similarly, workman B starts the actuating mechanism for labor at the rate of fifteen cents per hour and the actuating mechanism for burden at a normal rate of ten cents per hour. The burden registers for the individual workman are preferably omitted as in the case of the waste-wage and labor job registers, a single register being used to show the burden totalization for each job, and the burden totals for the various jobs are again totalized to give the grand total burden actually distributed. Let us assume that in a particular factory it has been found from experience that the normal burden amounts to $5.00 per hour. It is evident that with the normal number of men at work, such normal burden rates should be given to the workmen that the sum of these rates will amount to $5.00 per hour. With the normal number of men at work all the time and with the actuating burden mechanism for each man operating at his normal rate, the accumulation in the total burden register would be at the rate of exactly $5.00 per hour. Now let us assume that men to whom is assigned one-tenth of the burden do not go to work. In order to make up for this, the normal burden rates of all of the rest of the men must be increased compensatingly. For instance, the burden rate of A, instead of being twenty-five cents, would be raised to approximately twenty-eight cents; and B's burden rate instead of being ten cents, would be eleven cents. As will hereinafter be described, I have provided means by which these normal rates may be automatically increased or decreased, the ratio of rates between the various workmen remaining constant. In order to carry out these principles, I have provided means for rotating a shaft at a rate corresponding to the total burden charge to be distributed, with a register to indicate the amount of such rotation. Connected with the register showing the total distributed burden is a second shaft rotating in a direction opposite to that of the first shaft. A differential gear is placed between these two shafts and if the second shaft runs at a speed slower than that of the first shaft, the differential gear operates a mechanism by which the actuations of all the burden registers are increased, until the second shaft rotates at the same speed as the first shaft. Similarly, the actuation of the burden registers are automatically decreased if the second shaft rotates at a greater speed than that of the first shaft. The final result is that the burden actually distributed is thus automatically caused to equal the burden to be distributed.

It is clear that when a workman is receiving wages, but is not assigned to a job, while he has no burden apportionment, his "waste wages," should be added to the general or normal burden charge. I therefore provide means for automatically increasing the normal burden accumulation by the amount of this waste wage or supplementary burden accumulation, the first shaft above mentioned being rotated at a rate corresponding to the sum of these two rates, however these may vary from time to time; and, inasmuch as the waste wages form a considerable and widely fluctuating portion of the total accumulation which has been described above, the automatic inclusion of the waste wages in the total burden is a valuable feature of my system.

In the course of the month, if there are any unusual items of expense which it is necessary to include in the burden for that month, the initial general burden rate may be increased; or if toward the end of the month it is found that the burden for that month will be unexpectedly light the rate of the general burden accumulation may be decreased. The exact methods of accomplishing this result are described in detail hereafter. In certain cases, as in overtime work, it may be desirable to keep the burden rates temporarily fixed without automatic change, and for this purpose I provide means by which the automatic regulating feature can be cut out and the speed of the operating means governing the distribution may remain normal or may be regulated by hand, as desired.

To summarize the principal features of the system of burden distribution herein disclosed: It will be observed that my invention comprises both methods and means, patentably distinct and yet so intimately associated as to be properly covered by a common application. The mechanical features will be obvious from the details hereinafter given, and the general method has, roughly speaking, the following distinctive steps:

(1) the current accumulation and indication of the general burden, which may be easily checked against the total of the items which constitute the fiscal ledger account, together with a flexible increase or decrease of the rate of such accumulation; (2) the current distribution of this current production charge between jobs in process, on any desired basis, but preferably based on a normal burden rating for each man, with easy regulation of the individual ratios and an automatic regulation of the burden distribution to balance the total burden accumulation; (3) the current accumulation and indication of the waste wages, and the automatic inclusion of these waste wages with the general burden, to secure an automatic total burden accumulation, which is then appropriately distributed to the various jobs; (4) the current and automatic inclusion of the general burden cost and the waste-wage cost with the direct labor cost, to yield the grand total labor and overhead cost of production for each job, upon the ringing in of the individual workmen and the plugging in of the workmen to their respective jobs.

Figure 1:
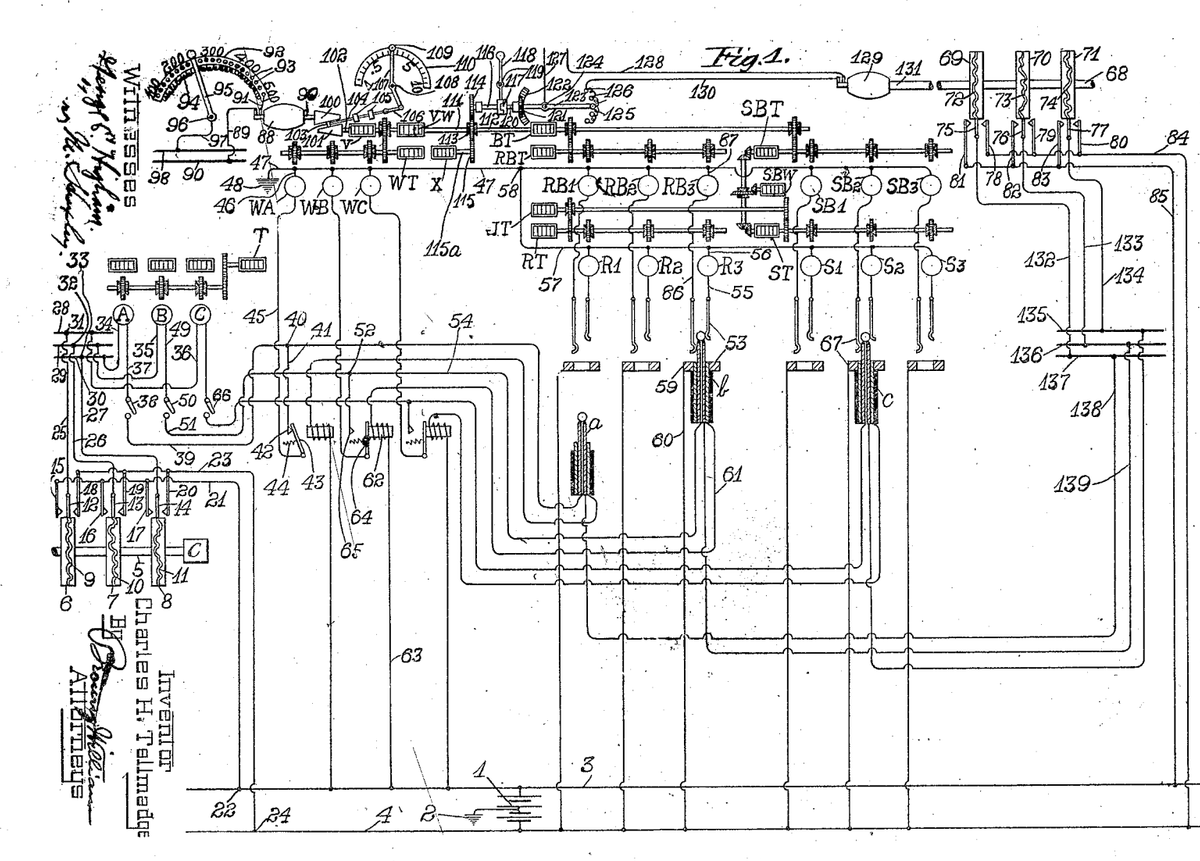
Figure 1 represents diagrammatically a system showing one embodiment of my invention for the distribution of the burden between the various jobs.

Taking up now the description of my system in detail. 1 is a battery, grounded at 2, the terminals of the battery being connected to the buses 3 and 4. On the shaft 5, time actuated by the clock movement C, are the disks 6, 7 and 8, in the peripheries of which are grooves 9, 10, and 11. On actuation of the shaft 5, spring contacts 12, 13 and 14 are adapted to follow the grooves 9, 10 and 11. On one side of the spring contacts 12, 13 and 14 are the contacts 15, 16 and 17, while on the other side are the contacts 18, 19 and 20. Contacts 15, 16 and 17 are connected with the bus 3 at the point 22. Contacts 18, 19 and 20 are connected with the conductor 23 which is connected with the bus 4 at point 24. It is evident that when the spring contacts 12, 13 and 14 come into connection with the contacts 15, 16 and 17, the current entering said spring contacts will come from the bus 3, whereas if said spring contacts come into connection with the contacts 18, 19 and 20, the current will come from the bus 4. The connection between the spring contacts and the contacts placed on either side of them is made by the action of the groove in the periphery of the disks by which electric impulses are thereby generated. Connected with the spring contacts 12, 13 and 14 are the conductors 25, 26 and 27, respectively, which are in turn, connected to bars 28, 29 and 30 at the points 31, 32 and 33. According to the varying number of impulses generated by the disks 6, 7 and 8, the bars 28, 29 and 30 correspond to various rates of wages, as will hereinafter be explained. For example: the bar 28 might be made to correspond to a rate of wages of ten cents an hour, 29 to fifteen cents an hour, and 30 to twenty cents an hour. These bars are preferably made of copper, of comparatively large cross-section, and to any one of them a considerable number of conductors leading to the wage registers, as will hereafter be explained, may be connected.

Figure 2:
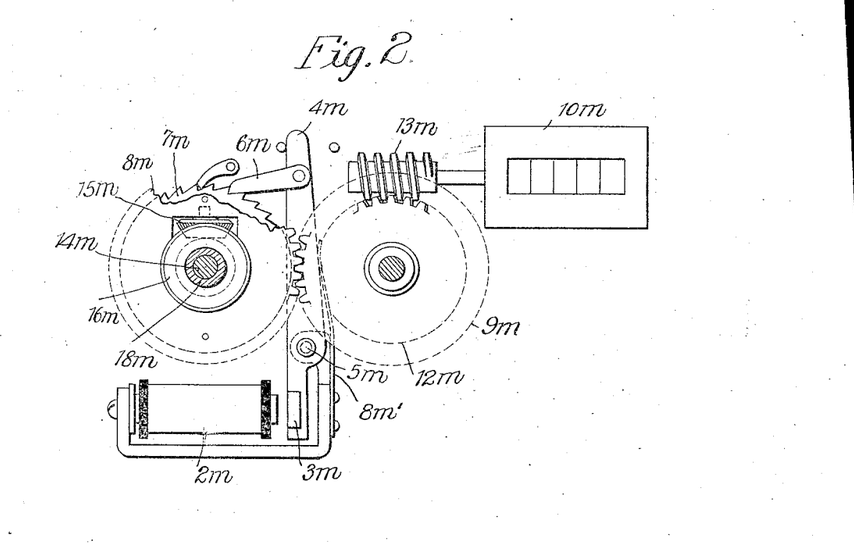
Fig. 2 shows a suitable form of electromagnetic mechanism, which may or may not have associated with it a register.

In the drawing, the conductors 34, 35 and 36 are connected to the bars 30, 29 and 28, respectively. From rate bar 30 the current passes through the conductor 34, to the electromagnetic actuating mechanism of the wage register A. This electromagnetic-actuating mechanism, which in and of itself constitutes no part of the present invention, may be in any approved form—such, for example, as that shown by way of illustration in Fig. 2. In this figure the electromagnet $2m$ is adapted to be included in the proper circuit-connections, and has associated therewith the armature $3m$, which is attached to the arm $4m$, pivoted at $5m$. The arm or lever $4m$ has pivoted thereto near its upper end the actuating-pawl $6m$, which is adapted to engage the teeth of the ratchet-wheel $7m$. A spring $8m$ normally tends to move the upper portion of the arm to the left. Whenever the electromagnet is energized it attracts its armature and thereby causes rotation of the arm in a clockwise direction. During this movement of the arm the actuating-pawl $6m$ drops into the next lower tooth. Upon deënergization of the electromagnet the arm is, under the influence of the spring $8m$, moved counter-clockwise, and the ratchet-wheel $7m$ is given a one-step advancement. Secured to the ratchet-wheel $7m$ is a gear $8m$, which meshes with the gear $9m$ to cause actuation of the register $10m$ through the connection between the worm-gear $12m$ and the worm $13m$, the worm-gear rotating with the gear $9m$ and the worm being attached to the shaft which is directly connected with the register. In case it is not necessary to have a register associated with the actuating mechanism, the gear connections leading from the ratchet-wheel $7m$ would be omitted. After going to the actuating mechanism of the register A, current passes through the wire 37 to the switch 38. If this switch is closed it then goes through the conductor 39 to the point 40, provided the plug $a$ which is assigned to the same workman to whom the register A is assigned, is not inserted in a jack, as will be explained hereafter. The current passes through the conductor 41 to the contact 42. Associated with this contact is a switch 43 which in its normal position is held in connection with the contact 42 by the spring 44. When thus in contact, current passes from the contact 42 through the switch 43, through the conductor 45, to the electromagnetic actuating mechanism WA, then through the conductor 46, to the conductor 47 and to ground 48. Associated with the actuating mechanism WA may be a register but for the purpose of my invention, such a register is not necessary and may preferably be omitted, as in the case of the drawing.

It has now become evident that when a workman starts work, and to indicate this fact, throws the switch which has been assigned to him, as for example 38, the wage register A and the actuating mechanism for a waste wage register WA are simultaneously set in operation.

Let us now take the case of a second workman whose wage register and actuating means for the same are represented at B. The current passes from the rate bar 29, through the conductor 35 to the electromagnetic actuating mechanism associated with the register B, then through the conductor 49, to the switch 50. If this switch is closed, the current passes through the conductor 51 to the point 52. Let us now assume that the workman has been assigned to a special job and he inserts his plug $b$ in the jack 53, which is one of a number of jacks associated with this job, which we represent as R. The current continues from the point 52 through the conductor 54 to the tip of the plug $b$, then through the tip contact of the jack 53, through the conductor 55, to the actuating mechanism $R^3$, then through the conductor 56, to the conductor 57, to the point 58, through the conductor 47, to the ground 48. Associated with the jack 53 is a ring contact 59, from which the conductor 60 leads to the bus 4. On the plug $b$ is a corresponding ring contact to which the conductor 61 is connected. This conductor 61 connects with the windings of the electromagnet 62. From the opposite terminal of this electromagnet the conductor 63 leads to the bus 3. It is now evident that when the plug $b$ is inserted in the jack 53, the circuit by which the electromagnet 62 is controlled, becomes closed and the electromagnet is energized. The switch 64 is preferably made of steel and acts as an armature. When the electromagnet 62 is energized, switch 64 is attracted and connection with the contact 65 is thereby broken. The actuating mechanism of the waste wage register WB which is permanently assigned to this workman is thereby stopped when the plug $b$ is inserted in the jack 53. When the workman to whom the wage register C has been assigned goes to work, and closes the switch 66, the current may be similarly traced when he inserts his plug $c$ in the jack 67, which is associated with a job S.

Thus far, I have described a method of actuating wage registers, waste wage registers and job registers, or the actuating mechanism associated with such registers. I will now describe that feature of my invention which deals with the distribution of the burden charge to the various jobs.

A shaft 68 is provided with disks 69, 70 and 71, having grooves 72, 73 and 74 in their peripheries. Running in these grooves are spring contacts 75, 76, and 77 on one side of which are the contacts 78, 79 and 80 and on the other side 81, 82 and 83. The contacts 78, 79 and 80 are connected to the conductor 84, which is connected with the bus 4. The contacts 81, 82 and 83, are connected with the conductor 85, which is connected with the bus 3. In a similar manner to that which has been described in connection with the generation of the impulses for the wage registers, the contacts 75, 76 and 77 are connected through the conductors 132, 133 and 134 with the rate bars 135, 136 and 137.

Each workman besides having a specified rate of wages has a burden rate which may be made dependent on the importance of his work, the amount of room he takes up, the kind of a machine on which he works and other similar factors. We will assume that the rate bars 135, 136 and 137 represent normal burden rates of fifteen, twenty and twenty-five cents per hour. To burden rate bar 137 is connected the conductor 138, leading to the sleeve of the plug $a$. Similarly conductor 139 connected to burden rate bar 136, leads to the sleeve of plug $b$. When this plug is inserted in the jack 53, the current passes from the burden rate bar 136 through the conductor 139, to the sleeve of plug $b$, then through the sleeve contact of the jack 53, through the conductor 86 to the actuating mechanism RB³. From this actuating mechanism the current passes through the conductors 87 and 47, to the ground 48. The current may be similarly traced in the case of workman C, who is assigned to job S.

Figure 3:
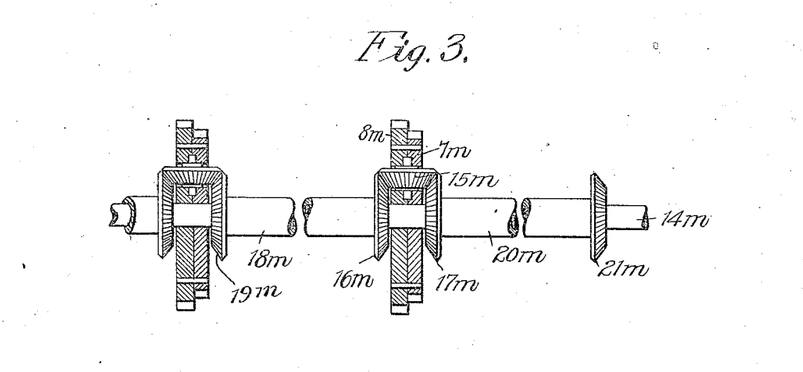
Fig. 3 represents part of a differential connection between various actuating mechanisms to totalize the actuations thereof.

It is now clear that when a workman is assigned to a job, and inserts his plug in one of the jacks associated with that job, a record is kept not only of the actual wages spent on the job, but also of the proportion of burden which should be borne by that job. As stated in connection with the description of the actuating mechanisms for the waste wage registers, it is preferable not to have a register associated with each individual actuating mechanism for the wages or burden which is distributed to the various jobs. In connection with each actuating mechanism, however, a suitable system of differential gearing is provided so that the actuations of the wage and burden mechanisms for any particular job, may be totalized. The totalizing connections between the registers whose actuations it is desired to summate do not, in and of themselves, constitute part of my invention, and I have, for the sake of illustration, shown in Fig. 3 a suitable form of differential gearing adapted to totalize the actuations of a plurality of register-operating mechanisms. The actuating-mechanisms are associated with a common shaft $14m$. To this shaft are rigidly secured the ratchet-wheels $7m$, to each of which is pivoted a beveled pinion $15m$, which engages at opposite sides with the beveled gears $16m$ and $17m$. The ratchet-wheel thus forms the central member of a differential set, of which the side members are the gears $16m$ and $17m$. In case a register is to be associated with the actuating mechanism and the gear wheel $8m$ is employed, the central member of this differential set will consist of the gear $8m$ and the ratchet-wheel $7m$ combined as one wheel, in which is pivoted the beveled pinion $15m$. In Fig. 4 the central member of the differential set is shown as being formed of the gear $8m$ and the ratchet-wheel $7m$. Every actuating-mechanism of course has this differential set of which the central member is actuated by the electromagnet, the rate of actuation depending upon the frequency of energization of the electromagnet. It will be clear from Fig. 3 that the gear $16m$ is secured to one end of a sleeve $18m$, the other end of which carries the beveled gear $19m$. Similarly, the gear $17m$ is rigidly carried by one end of the sleeve $20m$, the other end of this sleeve carrying the beveled gear $21m$. The sleeves and the central members are loosely mounted upon the common supporting shaft $14m$. The beveled gear $19m$ forms a side member of the next differential set, just as the corresponding beveled gear $17m$ forms a side member of the differential set shown. Similarly, the beveled gear $21m$ forms a side member of the differential set to the right of the one shown, just as the corresponding beveled gear $16m$ forms a side member of the differential set shown in Fig. 3. For the sake of simplicity I have not shown the other side members and central members of the differential sets to which the gear wheels $19m$ and $21m$ belong; it being readily understood from the differential set shown how the beveled gears $19m$ and $21m$ would be associated with their respective differential sets. Assuming the gear $17m$ to be stationary, the actuation of the ratchet-wheel $7m$ will be communicated to the gear wheels $16m$ and $19m$, which are mounted on the sleeve $18m$, because the beveled pinion will ride over the teeth of the stationary gear $17m$ and rotate the gear $16m$. Suppose that the beveled gear 17m should also be rotating by virtue of the actuation of the central member of the differential set to which the gear 21m belongs. In this case the beveled pinion 15m will be actuated not only by the associated ratchet-wheel 7m but also by the gear wheel 17m, so that the actuation of the beveled pinion 15m will be the sum of the actuations of the two adjacent register-actuating mechanisms. By means of this series connection of the differential sets it is possible to summate the actuations of any number of register-actuating mechanisms. The differential character of this totalizing connection permits the actuations of the various mechanisms to occur simultaneously without interfering with the proper summation thereof. It is thus seen that we have a compound shaft comprising a plurality of axially alined sections which are operatively connected by means of differential gearing, and that rotary motion may be imparted to this compound shaft at any of the points where such a differential system is interposed. This serial shaft, at one end, is connected to a totalizer and it will appear that any rotary motion applied to any section of the shaft will be transmitted directly to the end section which is associated with the totalizer. Thus, the section which is most remote from the totalizer will travel at the lowest rate of speed, if motion is being imparted to more than one section at a time, while those sections nearer the totalizer will operate at correspondingly higher rates of speed. In other words, if one actuating set is imparting motion to a certain section of the shaft, the starting of another actuating set results in the motion of the shaft section nearest the totalizer at a greater speed. If all the actuating sets are in operation, the shaft section directly associated with the totalizer will operate at a speed dependent upon the individual speeds of all the other sections.

The above described totalizing connection has been here set forth for the sake of illustration only, and it is obvious that any approved form of totalizing arrangement may be resorted to in connection with my invention. The actuations of the actuating mechanisms $R^1$, $R^2$, $R^3$ of the job R are totalized in the register RT. Similarly the actuations of the actuating mechanisms $S^1$, $S^2$, $S^3$ of the job S, are totalized at ST. By appropriate mechanism, registers RT and ST are totalized in the register JT. In the present invention, for the sake of simplicity, only two jobs are shown, provision being made for having three workmen assigned to each job. It is evident, however, that the number of jobs could be increased as desired, and the number of workmen assigned to any particular job similarly increased.

In a similar manner to that in which the wages distributed to each job are totalized, the burden charges for the jobs are totalized. In the job R, the actuations of the actuating mechanisms $RB^1$, $RB^2$, and $RB^3$ are totalized in the register RBT and for the job S, the actuations of the actuating mechanisms $SB^1$, $SB^2$, and $SB^3$ are totalized in the register SBT. The registers RBT and SBT are totalized in the register BT, which thus gives the total burden distributed to the various jobs. As shown in connection with job S, the actuations of the labor job register ST and the burden job register SBT may be totalized in a register SBW, which thus gives the total labor cost and burden for that job. The actuations of the actuating mechanisms for waste wage registers WA, WB and WC are totalized in the register WT, and for wage registers A, B and C, in the register T.

The amount of the general burden to be distributed between the various jobs is largely determined by previous experience; for example, the records of the previous month. In the present invention, I provide a shaft which is rotated at a rate corresponding to the amount of the general burden which it is desired to distribute. For this purpose I provide a motor 88, which is connected through the conductor 89, with the electric main 90. The other terminal of the motor is connected through the conductor 91 with the rheostat 92, having contacts 93, and resistance 94. The contacts of the rheostat 92 are appropriately marked with general burden rates which will correspond to the speed of the motor. For example, as shown in the drawing, the burden rate corresponds to from $1.00 to $5.00 per hour, or whatever unit of time is desired. Adapted to connect with the contacts of the rheostat 92 is the switch 95 pivoted at 96. Through the conductor 97, the switch 95 is connected with the electric main 98, thereby completing the circuit in which the motor 88 is included. The motor 88 should be provided with one of the devices well known in the art, for keeping its speed constant at whatever speed it is being operated. Connected to the shaft 99 of the motor 88 is a cone pulley 100, the surface of which is adapted to run parallel to that of a similar cone pulley 101 on the shaft 102. Between the two cone pulleys 100 and 101 is a connecting pulley 103, adapted to come in contact at the same time with the pulleys 100 and 101. The surface of this connecting pulley 103 may preferably be provided with rubber or some similar material so that the friction between it and the pulleys 100 and 101 may be increased. The connecting pulley 103 is mounted on a shaft 104, which is mounted in the bearings 105. Pivoted to the end of this shaft is a link 106, to the end of which is pivoted a bell crank 107, pivoted at 108 and provided with a handle 109. On moving this handle 109, to the right, it is evident that the shaft 104 will be moved to the left, thereby increasing the speed of the pulley 101 and the shaft 102. Similarly on moving the handle 109 to the left, the speed of the pulley 101 and the shaft 102 is correspondingly decreased. In order to gage accurately these differences in speed, a scale 110 is provided on which are indicated the relative speeds of the shafts 99 and 102. For example, if the handle 109 is moved to the extreme right of the scale, as shown in the drawing, the speed of the shaft 102 becomes ten times that of 99, whereas if it is moved to the extreme left of the scale, the speed of shaft 102 becomes one tenth that of 99. In the first case, therefore, it will be necessary to multiply the figures shown on the scale of the rheostat 92 by ten, in order to obtain a correct amount for the burden, whereas in the second case it will be necessary to divide by ten to obtain the correct figure.

Mounted on the shaft 102 is the register V which indicates the amount of the general burden which is accumulating to be distributed. By suitable differential gearing, the actuations of register V and register WT are totalized in the register VW, which is mounted on the shaft 111. The register BT showing the total burden which has been distributed to the jobs is similarly mounted on the shaft 112, which is made to rotate in an opposite direction from the shaft 111. Between the ends of these two shafts is the differential gear 113. In mesh with the differential gear 113 are the gears 114 and 115. Rigidly connected with the hub of the gear 115 is the shaft 115a with which the register X is associated. The purpose of this register is to indicate any differences arising between the speed of the shafts 111 and 112. It is evident that providing the shafts 111 and 112 are running at the same speed, the gears 114 and 115 will not be moved. The gear 114 is rigidly mounted on the shaft 116 which is provided with a clutch 117 operated by the lever 118, which is pivoted at 119. Connecting with the shaft 116 by means of clutch 117 is the shaft 120 on the end of which is the pinion 121. Adapted to operate in connection with the pinion 121 is the curved rack 122. Rigidly connected to the center of this rack is the switch 123, pivoted at 124. The switch 123 is adapted to operate in connection with a rheostat 125 having contacts 126. The conductor 127 connects with the switch 123 on one end, and is adapted to connect with a source of current on the other. The conductor 128 connects the other terminal of the source with the motor 129. Connecting the rheostat 125 with the motor 129 is a conductor 130 which thus completes the circuit in which this motor is included. The shaft 131 of the motor 129 is directly connected with the shaft 68.

It is now evident that if the actuations of the register BT are at a slower rate than those of the register VW, by the action of the differential gear 113 the switch 123 is automatically moved to include less resistance in the circuit of the motor 129, thereby increasing the speed of this motor, and correspondingly the speed of the shaft 68. More electric impulses will be driven to the rate bars 135, 136 and 137 and the burden rates for all of the workmen then assigned to jobs will be increased, although the proportions of burden rates between the various workmen will always remain the same. The result of this will of course be to increase the rapidity of actuations of the register BT until the shafts 111 and 112 are rotating in opposite directions at exactly the same speed, thereby causing the switch 123 to remain in its proper position.

It is evident that in the operation of this system, it will be necessary to have a much greater variation in the speed of the shaft 111 than in the speed of the shaft 131, because on the supposition that but few men are assigned to jobs, the actuation of the register BT would be at a low rate although the motor 129 might be running at a comparatively high speed. The general burden to be distributed under such circumstances would probably be low and for this reason a slow speed of the shafts 102 and 111 would be desired. On the other hand, if we suppose that a large number of men are assigned to jobs, the actuations of the register BT might be very rapid although the speed of the motor 129 would remain the same as in the first case. It would, however, now be necessary to greatly increase the speed of the shafts 102 and 111 to keep pace with this new condition.

Under certain circumstances it may not be considered desirable to regulate the distribution of the burden automatically as hereinbefore described, and for this reason the clutch 117 is provided. When the clutch is thrown out, the switch 123 may be set as desired, thereby operating the motor 129 and its connected shaft 68 at the desired speed. When the motor is running in this manner, one of the devices well known in the art should be provided for keeping the speed constant at whatever rate the motor is being operated.

From the above description, it is clear that my invention embodies a practicable method and means for distributing the total burden appropriately to a plurality of jobs, the wages of any workmen who are not assigned to jobs being included in the total burden. Instead of using my system for distributing the burden charge to jobs by means of giving each workman a normal burden rate and actuating the burden job register at a rate in proportion to the number and burden rates of the men at work, it is evident that a machine could be used as the basis of distribution, a certain normal burden rate being assigned to each machine, a suitable actuating mechanism put in operation when the machine is being used, and the normal burden rate varied by exactly the same method as is used in the case of the workmen. A combination of machines and workmen could similarly be used as a basis for distribution instead of using either exclusively workmen or exclusively machines, as such basis.

It is evident that considerable variations may be made in the exact system which I have described without departing from the spirit of my invention.

What I claim as new and desire to cover by Letters Patent is:

1. In an accounting system, a source of power, a plurality of burden registers assigned to a plurality of industrial units, actuating means associated with each of said registers, means for connecting each of said actuating means with said source of power, and controlling mechanism for maintaining the total actuation of said burden registers equal to a desired amount for changes in the number of said burden registers connected to said source of power.

2. In an accounting system, a source of power, a plurality of burden registers assigned to a plurality of industrial units, actuating means associated with each of said registers, means for connecting each of said actuating means with said source of power, controlling mechanism for maintaining the total actuation of said burden registers equal to a desired amount for changes in the number of said burden registers connected to said source of power, and means for changing said total amount as desired.

3. In an accounting system, a source of power, a plurality of burden registers assigned to a plurality of jobs, actuating means associated with each of said registers, means for connecting each of said actuating means with said source of power, means operated to correspond to a total burden charge for controlling said several connecting means to govern the distribution of the total burden charge to said registers, and means for varying the burden charge to be so distributed.

4. In an accounting system, a mechanism actuated at a rate corresponding to a burden charge to be distributed, a plurality of devices for receiving said burden charge, and means coöperating with said mechanism for automatically distributing said burden charge to said receiving devices.

5. In an accounting system, a mechanism actuated at a rate corresponding to a burden charge, a plurality of devices for receiving said burden charge, means for automatically distributing said burden charge to said receiving devices, and automatic means for so regulating the actuations of said distributing means that the rate of said actuations will agree with that of the actuation of said mechanism.

6. In an accounting system, a mechanism actuated at a rate corresponding to a burden charge to be distributed, a plurality of devices for receiving said burden charge, means for automatically distributing said burden charge to said receiving devices, and means for varying the rate of actuation of said mechanism, thus varying said burden to be distributed.

7. In an accounting system, the combination of a plurality of burden-receiving devices, a mechanism actuated at a rate corresponding to a burden charge to be distributed, automatic means for distributing the burden charge to said receiving devices, and means for automatically including waste or unproductive wages in said burden to be distributed.

8. In an accounting system, the combination of a plurality of burden-receiving devices, mechanism actuated at a rate corresponding to a total burden charge to be distributed, automatic means for distributing the total burden charge to said receiving devices, and means for automatically including waste or unproductive wages in said burden to be distributed.

9. In an accounting system, a mechanism actuated at a rate corresponding to a predetermined general burden charge, a second mechanism actuated at a rate corresponding to the amount of waste charges, means for totalizing the rates of actuations of said mechanisms, and means for automatically distributing to a plurality of jobs the total burden charge thus obtained.

10. In an accounting system, a plurality of burden registers, each register associated with a job, actuating means for each of said registers, means for totalizing the actuations of said registers in a total burden register, a mechanism actuated at a rate corresponding to a predetermined burden charge, and means for automatically varying the rates of actuation of said burden registers so that the actuation of said total burden register will be at the same rate as that of said mechanism.

11. In an accounting system, a plurality of burden registers, each register being associated with a job, actuating means for each of said registers, means for totalizing the actuations of said registers in a total burden register, a mechanism normally actuated at a rate corresponding to a predetermined general burden charge, means for varying said rate of actuation as said burden charge is varied, a mechanism actuated at a rate corresponding to the amount of waste wages, means for totalizing the actuations of said mechanisms, the resulting rate of actuations corresponding to the total burden, and means for automatically distributing said total burden charge to said burden registers.

12. In an accounting system, a mechanism actuated at a rate corresponding to a predetermined burden rate to be distributed, means for automatically distributing a burden rate into a plurality of portions, a total burden register adapted to indicate the amount of said burden thus distributed, and means associated with said register for automatically causing the actuation of said register to be at the same rate as that of said mechanism.

13. In an accounting system, a plurality of individual burden registers, each register assigned to a job, actuating means for each register, a total burden register, means for totalizing the actuations of said individual burden registers in said total burden register, and means for so varying the rates of said actuations that said total burden register will be actuated at a rate corresponding with a total burden rate to be distributed.

14. In an accounting system, a plurality of burden registers, each register associated with a job, an actuating mechanism for each of said registers, a source of power, means for connecting said actuating mechanisms with said source of power, a total burden register, means for totalizing the actuations of said burden job register in said total burden register, and means for so regulating the effective action of the source of power that said total burden register will be actuated at a rate corresponding with the total burden rate to be distributed.

15. In combination, a wage register, a waste wage register, a labor job register, a burden job register, actuating means associated with each of said registers, a source of power, means for so connecting said actuating means with said source of power that each of said registers will be actuated at a predetermined rate, and means for so independently varying the means of actuation of said burden job register to agree with the rate for a burden rate to be distributed.

16. In combination, a wage register, a waste wage register, a labor job register, a burden job register, actuating means for each of said registers, a source of power, means for so connecting said wage, waste wage and labor job registers with said source of power that they will be actuated at the same predetermined rate, means for so connecting said burden job register to said source of power that it will be actuated at an independent rate, and means for varying the rate of actuation of said burden job register to correspond with the rate of a burden charge to be distributed.

17. In combination, a source of electric current, a wage register, a waste wage register, a labor job register, a burden job register, an electro-magnetic actuating mechanism for each of said registers, means for intermittently connecting the actuating mechanisms of said wage, waste wage and labor job registers to said source of current, means for intermittently connecting the actuating mechanism of said burden job register to said source of current, and means for varying the rate of the last named intermittent connections.

18. In combination, a source of current, a wage register, a waste wage register, a labor job register, a burden job register, an actuating mechanism for each of said registers, means for intermittently connecting the actuating mechanisms of said wage, waste wage and labor job registers to said source of current, means for disconnecting the actuating mechanism of said waste wage register from said source during the connection of the actuating mechanism for said labor job register with said source and vice versa, means for intermittently connecting the actuating mechanism of said burden job register to said source of current, means for so regulating said second named intermittent connections that the rate of actuation of said burden job register may be correspondingly varied, a mechanism actuated at a rate corresponding to the general burden charge, means for totalizing the rates of actuation of said mechanism, and the actuating mechanism for said waste wage register, a second mechanism adapted to be actuated by said totalizing means, and means for automatically regulating the actuations of said burden job register to be at the same rate as those of said second mechanism which is actuated at a rate corresponding to the total burden charge to be distributed.

19. In combination, a source of current, a plurality of wage registers, a plurality of waste wage registers, a plurality of labor job registers, a plurality of burden job registers, an actuating mechanism for each of said registers, means for intermittently connecting the actuating mechanisms for said wage, waste wage and labor job registers with said source of current, means for intermittently connecting the actuating mechanism of each burden job register to said source, and means for so regulating said second named intermittent connections that the actuations of said burden job register will be proportionately varied.

20. In combination, a source of electric current, interrupter means for effecting electric impulses having a plurality of rates, a plurality of wage registers, a plurality of waste wage registers, a plurality of labor job registers, a plurality of burden job registers, an electromagnetic actuating mechanism for each of said registers, means for connecting the actuating mechanism for said wage, waste wage, and labor job registers with said interrupter means, a second interrupter means for effecting electric impulses having a plurality of rates, means for connecting the actuating mechanism of each burden job register to said second source of impulses, and means for so regulating said second interrupter means that the rates of said impulses will be proportionately varied.

21. In combination, a source of electric current, interrupter means for effecting impulses having a plurality of rates, a plurality of wage registers, a plurality of waste wage registers, a plurality of labor job registers, a plurality of burden job registers, an electromagnetic actuating mechanism for each of said registers, means for connecting the actuating mechanism for said wage, waste wage, and labor job registers with said interrupter means, a second interrupter means for effecting electric impulses having a plurality of rates, means for connecting the actuating mechanism of each burden job register to said second interrupter means, means for totalizing the actuations of the actuating mechanisms for said waste wage registers, a mechanism actuated at a rate corresponding to a general burden charge to be distributed, means for totalizing the actuations of said mechanism and the actuations of said total waste wage register, a second mechanism actuated by said totalizing means, means for totalizing the actuations of said burden job registers in a total burden register, and means for automatically regulating said second interrupter means so that the actuation of said total burden register will be at the same rate as that of said second mechanism which corresponds to the total burden rate to be distributed.

22. In an accounting system, a source of electric current, interrupter means for effecting impulses of said current, a burden job register, an electromagnetic mechanism for actuating said register, means for connecting said actuating mechanism with said interrupter means when a workman is assigned to a job, and means for so varying the means for effecting impulses that the rate of said impulses may be correspondingly varied.

23. In an accounting system, the combination of a source of power, a first register, means for actuating said register proportionally to the cost of a job in process, a second register, independent actuating means for operating said second register proportionally to the burden assigned to the job, and means for simultaneously placing the actuating means of said registers in condition to be actuated from said source when a workman is assigned to a job.

24. In an accounting system, the combination of a source of electric current, a first register, electrically-controlled means for actuating said register proportionally to the cost of a job in process, a second register, independent electrically-controlled actuating means for operating said second register proportionally to the burden assigned to said job, and means for simultaneously placing the actuating mechanisms of said registers in condition to be actuated from said source when a workman is assigned to a job.

25. In an accounting system, means for producing electric impulses of a predetermined rate, a labor job register, a burden job register, an electromagnetic actuating mechanism for each of said registers, means for connecting the actuating mechanism of said labor job register to said impulse producing means, a second means for producing electric impulses, and means for simultaneously connecting the actuating mechanism of said burden job register to said second impulse producing means.

26. In an accounting system, means for producing electric impulses of a predetermined rate, a labor job register, a burden job register, an electromagnetic actuating mechanism for each of said registers, means for connecting the actuating mechanism of said labor job register to said impulse producing means, a second means for producing electric impulses, means for connecting the actuating mechanism of said burden job register to said second impulse producing means, and means for varying the rate of impulses of said second impulse producing means.

27. In an accounting system, a burden job register, a labor job register, independent means for actuating each of said registers, and means for automatically totalizing the actuations of both of said registers.

28. In an accounting system, a plurality of burden job registers, a plurality of labor job registers, a burden job register and a labor job register being associated with each job, independent actuating means associated with each of said registers, and means for automatically integrating the actuations of said burden job register with the actuations of said labor job register for each job.

29. In an accounting system, means for producing electric impulses of a predetermined rate, a labor job register, a burden job register, an electromagnetic actuating device for each of said registers, a second means for producing electric impulses, a jack having one contact associated with the actuating mechanism for said labor job register and a second contact associated with the actuating mechanism for said burden job register, a plug having one contact associated with said first means for producing electric impulses and a second contact associated with said second means for producing electric impulses, said plug when inserted in said jack adapted to simultaneously connect the actuating mechanism of said labor job register with said first impulse producing means and the actuating mechanism for said burden job register with said second impulse producing means.

30. In an accounting system, means for producing electric impulses of a predetermined rate, a labor job register, a burden job register, an electromagnetic actuating device for each of said registers, a second means for producing electric impulses, a jack having one contact associated with the actuating mechanism for said labor job register, and a second contact associated with the actuating mechanism for said burden job register, a plug having one contact associated with said first electric impulse producing means and a second contact associated with said second electric impulse producing means, said plug when inserted in said jack adapted to simultaneously connect the actuating mechanism of said labor job register with said first impulse producing means and the actuating mechanism for said burden job register with said second impulse producing means, and means for varying the rate of impulses of said second means.

31. In an accounting system, means for producing electric impulses of a predetermined rate, a labor job register, a burden job register, an electromagnetic actuating device for each of said registers, a second means for producing electric impulses, a jack having one contact associated with the actuating mechanism for said labor job register, and a second contact associated with the actuating mechanism for said burden job register, a plug having one contact associated with said first means for producing electric impulses and a second contact associated with said second electric impulse producing means, said plug when inserted in said jack adapted to simultaneously connect the actuating mechanism of said labor job register with said first impulse producing means and the actuating mechanism for said burden job register with said second impulse producing means, and a variable speed source of power for varying the rate of impulses of said second means.

32. In an accounting system, means for producing electric impulses of a predetermined rate, a labor job register, a burden job register, an electromagnetic actuating device for each of said registers, a second electric impulse producing means, a jack having one contact associated with the actuating mechanism for said labor job register, and a second contact associated with the actuating mechanism for said burden job register, a plug having one contact associated with said first source of electric impulses and a second contact associated with said second source of electric impulses, said plug when inserted in said jack adapted to simultaneously connect the actuating mechanism of said labor job register with said first impulse producing means and the actuating mechanism for said burden job register with said second impulse producing means, and a variable speed motor for varying the rate of impulses of said second means.

33. In an accounting system, means for producing electric impulses of a predetermined rate, a labor job register, a burden job register, an electromagnetic actuating device for each of said registers, a second means for producing electric impulses, a jack having one contact associated with the actuating mechanism for said labor job register, and a second contact associated with the actuating mechanism for said burden job register, a plug having one contact associated with said first electric impulse producing means and a second contact associated with said second electric impulse producing means, said plug when inserted in said jack adapted to simultaneously connect the actuating mechanism of said labor job register with said first impulse producing means and the actuating mechanism for said burden job register with said second source of impulses, and means for totalizing the actuations of said labor job and burden job registers.

34. In an accounting system, a rotatable shaft, a variable speed motor for rotating said shaft at a rate corresponding to a general burden charge, and a register for indicating the rotation of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden charge.

35. In an accounting system, a rotatable shaft, a variable speed motor for rotating said shaft at a rate corresponding to a general burden rate, and a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a source of power, a burden job register, means for actuating said register, and means for connecting said actuating means to said source of power when a workman is assigned to a job, and means for so controlling the effective action of said source of power that said burden job register will be actuated at a rate corresponding to that of said third shaft.

36. In an accounting system, a rotatable shaft, a variable speed motor for rotating said shaft at a rate corresponding to a general burden rate, and a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a source of electric current, interrupter means for effecting impulses of said current, a burden job register, an electromagnetic mechanism for actuating said register, means for connecting said actuating mechanism with said source of current when a workman is assigned to a job, and means for so regulating the means for imparting impulses to said current that the actuations of said burden job register will be at the same rate as the rotation of said third shaft.

37. In an accounting system, a rotatable shaft, a variable speed motor for rotating said shaft at a rate corresponding to a general burden rate, a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, means for producing electric impulses of a predetermined rate, a labor job register, a burden job register, an electromagnetic actuating device for each of said registers, a second means for producing electric impulse producing means, a jack having one contact associated with the actuating mechanism for said labor job register and a second contact associated with the actuating mechanism for said burden job register, a plug having one contact associated with said first source of electric impulses and a second contact associated with said second impulse producing means, said plug when inserted in said jack adapted to simultaneously connect the actuating mechanism of said labor job register with said first impulse producing means, and the actuating mechanism for said burden job register with said second impulse producing means, and means for varying the rate of impulses of said second means, so that the actuation of said burden job register will be at the same rate as that of the rotation of said third shaft.

38. In an accounting system, a rotatable shaft, a variable speed motor for rotating said shaft at a rate corresponding to a general burden rate, a register for indicating the rotations of said shaft, a waste wage register, means for actuating said waste wage register, a shaft rotating at a rate corresponding to the actuation of said waste wage register, a differential gear for totalizing the rates of rotation of said shafts, a third shaft adapted to be rotated by said differential gear, the rate of rotation of said third shaft corresponding to the total burden rate, a source of power, a burden job register, means for actuating said register, means for connecting said actuating means to said source of power, a shaft associated with said burden job register, said shaft adapted to rotate in an opposite direction to that of said shaft rotating at a rate corresponding to the total burden rate, a differential gear between the two said shafts, and means actuated by said differential gear for so controlling the effective action of said source of power that the two said shafts will be rotated in opposite directions at the same rate.

39. In an accounting system, a rotatable shaft, a variable speed motor for rotating said shaft at a rate corresponding to a general burden rate, a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, means for producing electric impulses, a burden job register, an electromagnetic actuating mechanism for said register, means for connecting said actuating mechanism with said impulse producing means, a shaft associated with said burden job register, said shaft adapted to rotate in an opposite direction to that of said shaft rotating at a rate corresponding to the total burden rate, a differential gear between the two said shafts, and means actuated by said differential gear for so controlling the rate of impulses of said means that the two said shafts will be rotated in opposite directions at the same rate.

40. In an accounting system, a rotatable shaft, a variable speed motor for rotating said shaft at a rate corresponding to a general burden rate, a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a plurality of burden job registers, actuating means for each of said registers, a source of power, means for connecting said registers to said source of power, means for totalizing the actuations of said burden job registers, a shaft adapted to be rotated by said totalizing means in an opposite direction to that of the shaft rotating at a rate corresponding to the total burden rate, a differential gear between said shafts, and means actuated by said differential gear for so controlling the action of said source of power that the rotation of said shaft corresponding to said totalization of the burden job registers will be at the same rate as that of the shaft rotating at a rate corresponding to the total burden rate.

41. In an accounting system, a rotatable shaft, a variable speed motor for rotating said shaft at a rate corresponding to a general burden charge, a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a plurality of burden job registers, an electromagnetic actuating mechanism for each of said registers, means for producing electric impulses, means for connecting said registers with said impulse producing means, means for totalizing the actuations of said burden job registers, a shaft adapted to be rotated by said totalizing means in an opposite direction to that of the shaft rotating at a rate corresponding to the total burden rate, and means actuated by said differential gear for so controlling the action of the rate of said impulses that the rotation of said shaft corresponding to said totalization of the burden job register will be at the same rate as that of the shaft rotating at a rate corresponding to the total burden rate.

42. In an accounting system, a rotatable shaft, a variable speed motor for rotating said shaft at a rate corresponding to a general burden rate, a register for indicating the rotation of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a burden job register, actuating means for said register, a source of power, means for connecting the actuating mechanism of said register with said source of power, a variable speed mechanism for so controlling said source of power that the actuations of said register will be correspondingly varied, a shaft associated with said burden job register, said shaft adapted to rotate in an opposite direction to that of the shaft rotating at a rate corresponding to the general burden rate, a differential gear between the two said shafts, and means actuated by said differential gear for so controlling said source of power that the two said shafts will be rotated in opposite directions at the same rate.

43. In an accounting system, a rotatable shaft, a variable speed motor for rotating said shaft at a rate corresponding to a general burden rate, a register for indicating the rotations of said shaft, a waste wage register, means for actuating said waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a burden job register, an electromagnetic actuating mechanism associated with said register, a source of electric current, a variable speed mechanism for effecting impulses of said current, means for connecting the actuating mechanism of said register with said source of current, a shaft associated with said burden job register, said shaft adapted to rotate in an opposite direction to that of said shaft rotating at a rate corresponding to the total burden rate, a differential gear between the two shafts, and means actuated by said differential gear for automatically so controlling said mechanism for effecting impulses of said current that the shaft associated with said burden job register will be rotated at the same rate as that of the shaft corresponding to the total burden rate.

44. In an accounting system, a rotatable shaft, a variable speed motor for rotating said shaft at a rate corresponding to a general burden rate, a register for indicating the rotations of said shaft, a waste wage register, a shaft rotating at a rate corresponding to the actuations of said waste wage register, a differential gear for totalizing the rates of rotation of said shafts, a third shaft adapted to be rotated by said differential gear, the rate of rotation of said third shaft corresponding to the total burden rate, a source of electric current, a mechanism for effecting impulses of said current, a variable speed motor for varying the speed of said mechanism, a burden job register, an electromagnetic actuating mechanism for said register, means for connecting the actuating mechanism for said register with said source of current, a shaft associated with said burden job register, said shaft adapted to rotate in an opposite direction from that of said shaft rotating at a rate corresponding to the total burden rate, a differential gear between the two said shafts, and a switch actuated by said differential gear for so controlling the speed of said motor that the rate of rotation of the shaft associated with said burden job register will be at the same rate as that of the shaft having a rate of rotation corresponding to the total burden charge.

In witness whereof, I hereunto subscribe my name this 27th day of February, A. D. 1909.

CHARLES H. TALLMADGE.

Witnesses:
HENRY M. HUXBY,
FRED O. HEUSER.